United States Patent [19]

Kamiguchi et al.

[11] Patent Number: 5,549,857
[45] Date of Patent: *Aug. 27, 1996

[54] INJECTION PRESSURE MONITORING METHOD

[75] Inventors: Masao Kamiguchi; Noriaki Neko, both of Oshino-mura, Japan

[*] Notice: The term of this patent shall not extend beyond the expiration date of Pat. No. 5,296,179.

[73] Assignee: Fanuc Ltd., Japan

[21] Appl. No.: 254,439

[22] Filed: Jun. 6, 1994

Related U.S. Application Data

[63] Continuation of Ser. No. 940,882, filed as PCT/JP92/00206 Feb. 25, 1992, abandoned.

[30] Foreign Application Priority Data

Feb. 26, 1991 [JP] Japan .................................. 3-53766

[51] Int. Cl.⁶ .................................................. B29C 45/76
[52] U.S. Cl. ................... 264/40.1; 264/40.5; 264/328.1; 364/476.01; 425/145; 425/147; 425/149; 425/170; 425/171
[58] Field of Search .................... 264/40.1, 40.5, 264/328.1; 425/135, 145, 147, 149, 150, 169, 170, 171, 172; 364/476

[56] References Cited

U.S. PATENT DOCUMENTS

| | | | |
|---|---|---|---|
| 4,311,446 | 1/1982 | Hold et al. | 425/145 |
| 4,411,609 | 10/1983 | Yoshii et al. | 425/149 |
| 5,013,231 | 5/1991 | Fujita et al. | 425/145 |
| 5,031,108 | 7/1991 | Fujita et al. | 364/476 |
| 5,031,127 | 7/1991 | Fujita et al. | 364/476 |
| 5,097,431 | 3/1992 | Harada et al. | 364/476 |
| 5,133,910 | 7/1992 | Manabe et al. | 425/145 |
| 5,296,179 | 3/1994 | Kamiguchi et al. | 264/40.5 |

FOREIGN PATENT DOCUMENTS

| | | |
|---|---|---|
| 0478788 | 4/1992 | European Pat. Off. . |
| 0525198 | 2/1993 | European Pat. Off. . |
| 3809792 | 10/1988 | Germany . |
| 3839907 | 6/1989 | Germany . |
| 61-197214 | 9/1986 | Japan . |
| 63-9522 | 1/1988 | Japan . |
| 2062293 | 5/1981 | United Kingdom . |
| 9113746 | 9/1991 | WIPO . |

OTHER PUBLICATIONS

Rosato, *Injection Molding Handbook*, 1986, pp. 98–103 and 284–307.

"Transfer Molding Apparatus," Osamu Yamauchi, Patent Abstracts of Japan, vol. 8, No. 76 (M–288) (1513), Apr. 9, 1984.

"Molding by Means of Injection and Compression Molding Machine and Its Molding Device," Hideaki Okubo, Patent Abstracts of Japan, vol. 13, No. 560 (M–906) (3908), Dec. 13, 1989.

*Primary Examiner*—Jill L. Heitbrink
*Attorney, Agent, or Firm*—Staas & Halsey

[57] ABSTRACT

An injection pressure monitoring method in which the correlations between a screw position, injection pressure, and cavity fill for an injection molding machine are monitored and displayed on a screen. The pressure for the position of a screw is graphically displayed on the screen, and a picture of a cavity is also displayed on the screen. By inputting the screw position, the pressure for the screw position is monitored, and at the same time, the resin filling state in the cavity corresponding to this screw position is displayed as an image.

21 Claims, 11 Drawing Sheets

| VOLUME | REGION TO BE SMEARED | NUMBER OF LINES | POINT |
|---|---|---|---|
| $V_1$ | INSIDE STRAIGHT LINE $P_{11}-P_{12}$ | $L_1$ (=1) | $P_{11}, P_{12}$ |
| $V_2$ | INSIDE STRAIGHT LINE $P_{21}-P_{22}$ | $L_2$ (=1) | $P_{21}, P_{22}$ |
| $V_5$ | INSIDE TWO STRAIGHT LINES $P_{51}-P_{52}$ AND $P_{53}-P_{54}$ | $L_5$ (=2) | $P_{51}, P_{52}$ $P_{53}, P_{54}$ |
| $V_6$ | INSIDE TWO STRAIGHT LINES $P_{61}-P_{62}$ AND $P_{63}-P_{64}$ | $L_6$ (=2) | $P_{61}, P_{62}$ $P_{63}, P_{64}$ |
| $V_{n-1}$ | INSIDE TWO STRAIGHT LINES $P_{n-1,1}-P_{n-1,2}$ $P_{n-1,3}-P_{n-1,4}$ | $L_{n-1}$ (=2) | $P_{n-1,1}, P_{n-1,2}$ $P_{n-1,3}, P_{n-1,4}$ |
| $V_n$ | WHOLE REGION | — | — |

| ADDRESS | SCREW POSITION | PRESSURE | TIME |
|---|---|---|---|
| 0 | $SC_0$ | $PR_0$ | $t = 0$ |
| 1 | $SC_1$ | $PR_1$ | $t = \tau$ |
| 2 | $SC_2$ | $PR_2$ | $t = 2\tau$ |
| i | $SC_i$ | $PR_i$ | $t = i\tau$ |
| n−1 | $SC_{n-1}$ | $PR_{n-1}$ | $t = (n-1)\tau$ |
| n | $SC_n$ | $PR_n$ | $t = n\tau$ |

FIG. 4

INJECTION PRESSURE MONITORING METHOD

This application is a continuation of application Ser. No. 07/940,882, filed as PCT/JP/92/00205, on Feb. 25, 1992, now abandoned.

BACKGROUND OF THE INVENTION

1. Field of the Invention

The present invention relates to an injection molding machine controlled by means of a processor, and more particularly, to an injection pressure monitoring method for injection condition setting.

2. Description of Related Art

In an injection stage of an injection molding machine, injection speed control is effected such that the injection speed is changed by stages in accordance with the screw position. Since the flow resistance of a resin moving in a mold cavity varies depending on the region where the resin passes, it is advisable to set the injection speed changeover position and the speed of each stage in accordance with the change of the flow resistance. To attain this, it is necessary to grasp the filling state of the resin in the mold cavity which corresponds to the screw position in the injection stroke.

Conventionally, the short-shot method or the like has been used as a method for examining the filling state of the resin in the mold cavity. According to this method, the mold is opened to examine the resin fill after injecting the resin in a small amount, and the injection quantity is then gradually increased. By doing this, the screw positions where the flow resistance changes are obtained according to the actual position of the resin loaded in the mold, and the injection speed changeover position is obtained on the basis of the screw position.

In this short-shot method, as described above, it is necessary to increase the injection quantity of the resin little by little, and to open the mold to examine the leading end position of the resin in the mold with every cycle of injection. This requires much time and labor. In some molds for molding connectors and the like, moreover, the resin may be excessively loaded while operating conditions are being set by the short-shot method, arousing a problem.

SUMMARY OF THE INVENTION

An object of the present invention is to provide an injection pressure monitoring method for graphically displaying the relationship between the screw position and injection pressure.

Another object of the present invention is to provide an injection pressure monitoring method in which an injection pressure, along with pictures of a screw and a mold cavity, is displayed on a display unit so that the relationships between the injection pressure and screw position and between the injection pressure and resin filling state in the cavity are offered in the form of images to those who set a condition, whereby setting injection conditions is facilitated.

In order to achieve the above object, in an aspect of the present invention, there is provided a method for detecting a screw position by means of screw position detecting means, detecting a pressure acting on a resin by means of an injection pressure sensor, and displaying the pressure waveform of a pressure for the screw position on a screen of a display device in accordance with the detected screw position and pressure, so that the injection pressure can be monitored, cavity data for a mold are previously stored, at least one cycle of injection is executed, the configuration of a cavity, along with the pressure waveform detected during the injection, is then displayed on the screen of the display device, the screw position is inputted so that the input screw position is displayed on the screen of the display device, a resin injection quantity corresponding to the input screw position is obtained, and a filling resin state corresponding to the resin quantity is displayed with respect to the drawn cavity configuration.

Preferably, in displaying the filling resin state, the mold cavity is divided into a plurality of regions, the respective volumes of the individual divided regions covering the cavity inlet are obtained and previously stored as the cavity data, the resin injection quantity is obtained according to the input screw position, the resin injection quantity and the volumes are compared, and those regions which cover the resin injection quantity are discriminatively displayed for the cavity configuration on the screen of the display device.

In another aspect of the present invention, moreover, the stored volumes are successively read with every set predetermined time, the screw position for the injection of a resin quantity corresponding to the volumes is obtained, the screw position is displayed on the display device, and the region of the read volumes for the cavity configuration on the screen of the display device is discriminatively displayed.

Further, the entry of the screw position, in an aspect, is advanced in the injection direction for a distance automatically set with every predetermined time. Alternatively, the entry of the screw position is advanced or retreated for a set predetermined distance every time a movement command key is depressed.

Preferably, a cylinder configuration is further drawn on the screen of the display device, and a screw configuration is drawn in the drawn cylinder in accordance with the input screw position. Also, a mark indicative of the input screw position is put in a position corresponding to the input screw position in the pressure waveform of the pressure for the screw position displayed by the display device.

In another aspect of the present invention, furthermore, injection is started during continuous molding operation, the screw position and pressure are then detected by means of the screw position detecting means and injection pressure sensor with every predetermined cycle, the detected pressure compared with the detected position is graphically displayed on the screen, the quantity of a resin to be filled into the cavity is obtained in accordance with the detected screw position, and a resin filling state is displayed in the drawn cavity.

In another aspect of the present invention, moreover, there is provided a method for detecting a screw position by means of screw position detecting means, detecting a pressure acting on a resin by means of an injection pressure sensor, and displaying a pressure waveform for the detected screw position on a screen so that the injection pressure can be monitored, the injection pressure monitoring method comprising executing at least one cycle of injection, then drawing the pressure waveform detected during the injection, drawing a cylinder configuration, and correspondingly drawing a screw configuration in the drawan cylinder configuration as the screw position is inputted.

According to the method of the present invention, as described above, when the screw position is inputted manually or automatically in accordance with set conditions, information on the region of the mold cavity to which the resin is filled by injection for a stroke from a screw back position and the present input position is displayed as an image on the screen. As a result, the relationships between the screw position, pressure, and resin filling state in the cavity are made clear to those who set the condition, and conditions for injection speed control can be set accurately and easily.

As the screw position is manually inputted, moreover, the screw configuration for the state in which the screw is advanced in the cylinder for a distance corresponding to the input value of the screw position is displayed on the screen. Thus, the position of the screw in the cylinder, the pressure for that time, etc. can be grasped at once.

BRIEF DESCRIPTION OF THE DRAWINGS

FIG. 3 is a diagram for illustrating a table stored with cavity data;

FIG. 4 is a diagram for illustrating data to be stored when an injection pressure for a screw position is monitored;

DETAILED DESCRIPTION OF PREFERRED EMBODIMENTS

Am embodiment of the present invention will now be described with reference to the accompanying drawings.

Figure 1:
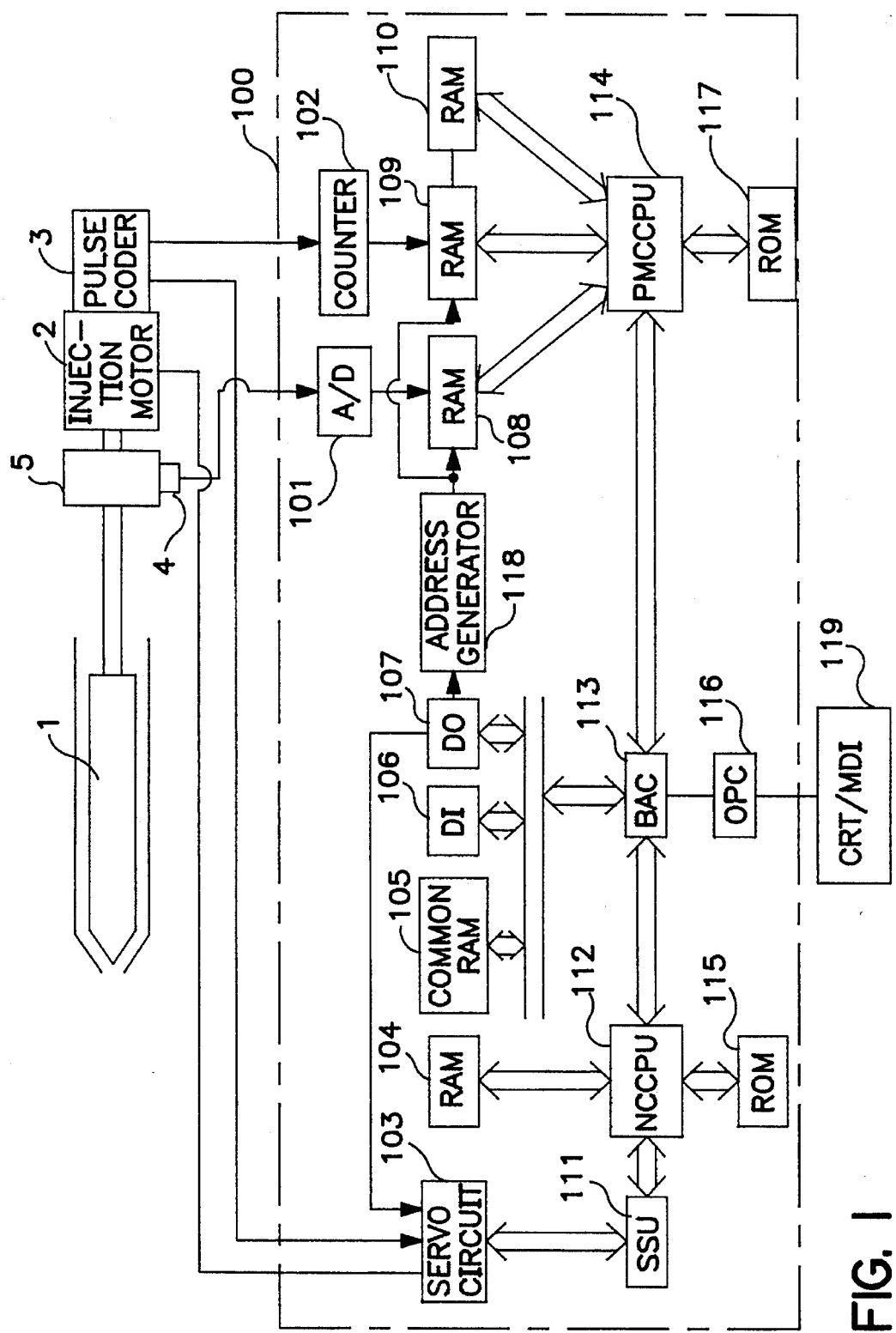
FIG. 1 is a block diagram showing the principal part of an injection molding machine for carrying out a method according to the present invention.

FIG. 1 is a block diagram showing a motor-operated injection molding machine according to one embodiment of the present invention and the principal part of a control system for this injection molding machine. In FIG. 1, only those elements which are associated with an injection axis are illustrated, and those which are associated with other axes, such as a mold clamping axis, screw rotation axis, ejector axis, etc., are omitted. Referring to FIG. 1, the motor-operated injection molding machine comprises elements such as a numerical control device (hereinafter referred to as NC device) 100 for controlling the injection molding machine, a screw 1, an injection servomotor 2 for driving the screw 1 in the axial direction, a pulse coder 3 attached to the injection servomotor 2 and serving to detect the present position of the screw 1, and an injection pressure sensor 4 which is mounted in a position in an injection mechanism 5 for axially driving the screw 1 where a pressure acting on the screw 1 is detected, and serves to detect the resin pressure in the cavity of a mold which acts as a reaction force in the direction of the screw axis.

The NC device 100 includes a microprocessor (hereinafter referred to as CPU) 112 for NC and a CPU 114 for a programmable machine controller (hereinafter referred to as PMC). The CPU 114 for PMC, that is, PMCCPU 114 is bus-connected with a ROM 117, which is stored with sequence programs for controlling the sequence operation of the injection molding machine, programs for a monitoring process of the present invention mentioned later, etc., and a RAM 110 for PMC. On the other hand, the CPU112 for NC, that is, NCCPU 112 is connected with a ROM 115 storing management programs for generally controlling the injection molding machine, and is connected, through a servo interface 111, with servo circuits for operatively controlling servomotors for various axes for injection, clamping, screw rotation, ejector operation, etc. FIG. 1 shows only a servo circuit 103 for the injection servomotor 2, among these servo circuits. A nonvolatile common RAM 105, which is composed of a bubble memory or CMOS memory, includes a memory section for storing NC programs and the like for controlling various operations of the injection molding machine, and setting memory section for storing various set values, parameters, macro variables, etc. A bus arbiter controller (hereinafter referred to as BAC) 113 is connected with the respective buses of the NCCPU 112, the PMCCPU 114, the common RAM 105, an input circuit 106, and an output circuit 107, and the buses used are controlled by means of the BAC 113.

A manual data input device with CRT display unit (hereinafter referred to as CRT/MDI) 119 is connected to the BAC through an operator panel controller 116, and various commands and set data can be inputted by operating various operating keys, such as soft keys, ten-keys, etc. A RAM 104, which is bus-connected to the NCCPU 112, is used for temporary storage of data and the like.

FIG. 1 shows only those elements which are associated with the injection axis, that is, the injection servomotor 2 for driving the screw 1 for injection and the pulse coder 3 attached to the injection servomotor 2 and serving to detect the rotation of this servomotor and the screw position. Those elements which are associated with the other axes, such as the mold clamping axis, screw rotation axis, ejector axis, etc., are omitted in FIG. 1. In FIG. 1, moreover, only the servo circuit of the NC device 100 for the injection servomotor is illustrated, and the servo circuits for the other axes are omitted. This servo circuit 103 is connected to the injection servomotor 2, and the output of the pulse coder 3 is applied to the servo circuit 103. Further, a torque limit value for controlling the output torque of the injection servomotor 2 is delivered from the output circuit 107 to the servo circuit 103.

Furthermore, an address generator 118 is connected to the output circuit 107, and the output of the address generator 118 is applied to RAMs 108 and 109, which are bus-connected to the PMCCPU 114, so that the same addresses of the RAMs 108 and 109 can be assigned. An output signal from the injection pressure sensor 4 is connected to the RAM 108 through an A/D converter 101, and a counter 102 for detecting the screw position by counting signals from the pulse coder 3 is connected to the RAM 109. When an injection start command is outputted from the output circuit 107, the address generator 118 generates specific addresses in regular order in a predetermined sampling cycle, assigns the same addresses of the RAMs 108 and 109, and stores the assinged addresses with the respective outputs of the A/D converter 101 and the counter 102.

In this arrangement, the NC device 100 causes the PMC-CPU 114 to perform sequence control in accordance with the sequence programs stored in the ROM 117, and the NCCPU 112 distributes pulses to the servo circuits for the individual servomotors in accordance with the NC programs set and stored in the common RAM 105, thereby driving the injection molding machine.

The resin pressure detected by means of the injection pressure sensor 4 is converted into a digital signal by means of the A/D converter 101, written in the RAM 108 with every predetermined cycle, and reloaded in succession as a current resin pressure. The PMCCPU 114 reads out the resin pressure written in the RAM 108 with every predetermined cycle, and loads the common RAM 105 with the read-out resin pressure value in succession through the BAC.

Figure 2:
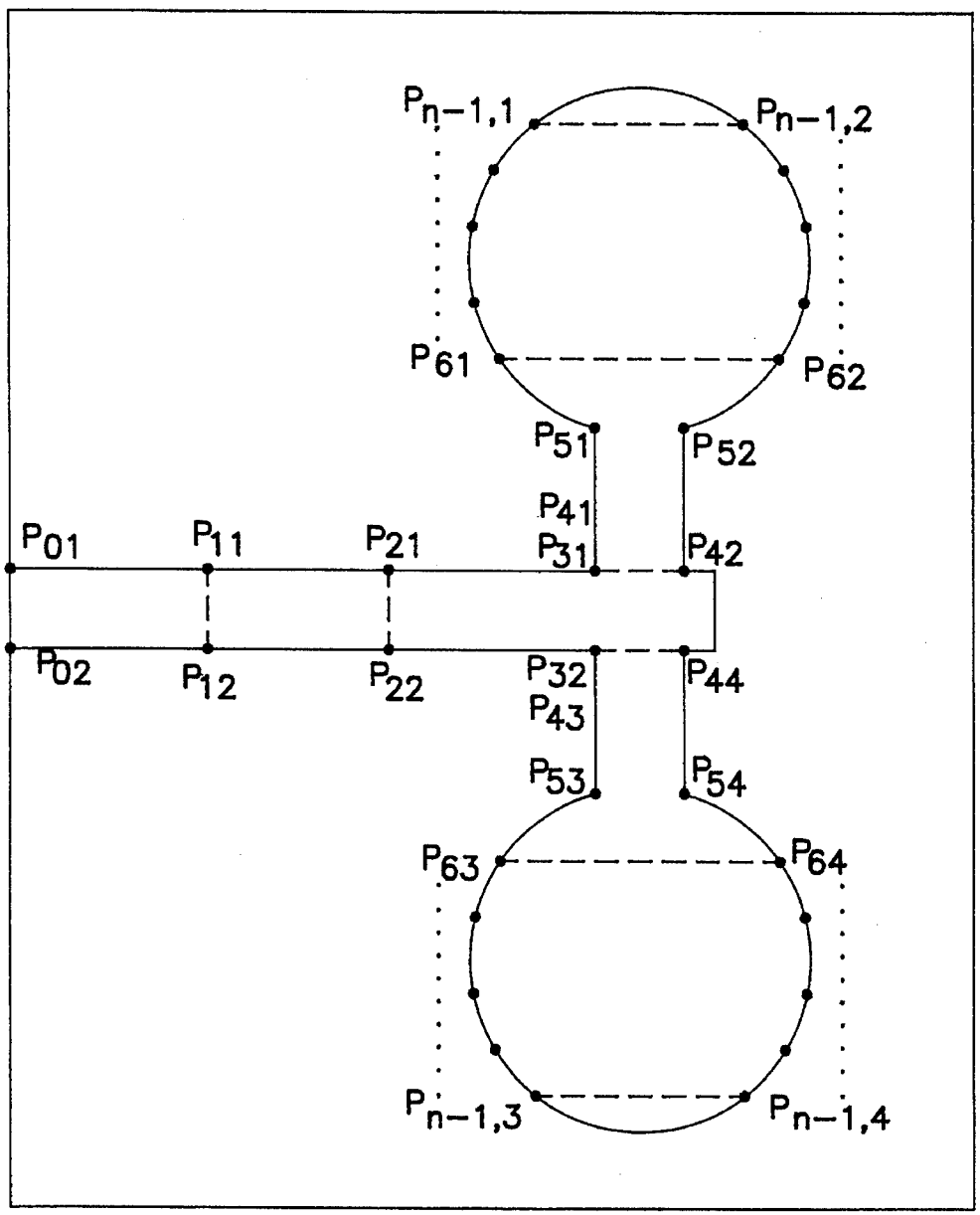
FIG. 2 is a diagram for illustrating a process for displaying a plurality of divided regions of a mold cavity on a screen.

In the present embodiment, the common RAM 105 of the NC device 100 is loaded with cavity data, such as a profile, representing the cavity configuration of the mold used for injection molding, and a table TB mentioned later. The cavity data are obtained when the mold is designed by using a CAD system. With use of these data, the cavity configuration (picture representing the profile (contour) of the cavity) shown in FIG. 2 is drawn on the display, so that a filling region for the volume of a resin filled in the drawn cavity can be displayed for identification by stages. To attain this, the common RAM 105 is loaded with the table TB for storing the cavity data shown in FIG. 3.

As shown in FIG. 3, the table TB stored with the volume (V1, V2, ... Vn) of the resin filled in the mold cavity, the number (L1, L2, ... Ln) of lines necessary for drawing in the drawn cavity, in order to define the region identifying the filling volume, and points (P11, P12, P21, P22, ...) on the contour of the drawn cavity, which indicate the respective starting and end points of the aforesaid lines, is prepared as the mold is designed by means of the CAD system, and is previously stored in a floppy disk or the like. Then, a disk controller is connected to the operator panel controller 116, and the cavity data are loaded from the floppy disk into the common RAM 105 through the disk controller. Also, the respective configurations of a cylinder and screw to be drawn are entered in the common RAM 105 in advance. Further, a cursor is displayed in the screw position, and a vertical line in this cursor position.

Referring to FIG. 2, a plurality of points for displaying, by stages, the position of the leading end of the resin injected and flowing in the cavity are assigned on the contour representing the configuration (profile) of the mold cavity which is displayed on a display screen of the CRT/MDI 119. In assigning these points, those spots at which the flow resistance of the resin flowing in the cavity greatly changes are selected first. In the example shown in FIG. 2, the selected spots correspond individually to the position where points P31 and P32 are connected, position where points P41 (=P31) and P42 are connected, position where points P43 (=P32) and P44 are connected, position where points P51 and P52 are connected, and position where points P53 and P54 are connected. Then, the points (points P11 and P12, points P21 and P22, etc.) at which the regions defined by the aforesaid selected spots are divided in a suitable number are also selected. Preferably, the respective volumes of the regions thus divided should be nearly equal.

When the assignment of the points for displaying, by stages, the position of the leading end of the resin flowing in the cavity on the contour of the mold cavity configuration on the display screen is finished in this manner, the table TB shown in FIG. 3 is prepared in accordance with this assignment. More specifically, the table TB contains various items including (1) specifying points Pj.1, Pj.2, Pj.3, Pj.4, ... on the cavity contour for dividing the cavity into regions of predetermined volumes and setting combinations Pj.1–Pj.2, Pj.3–Pj.4, ... of the respective starting and end points of straight lines which connect the divided regions for discriminative display are set, (2) number Lj of the straight lines to be connected, (3) volumes Vj (j=1 to n) of the divided regions discriminated by the straight lines, etc. The values and number (n) of the divided volumes Vj (j=1 to n) of item (3) are values which are naturally determined by assigning the point P on the cavity contour. Thus, the larger the number of divisions of the cavity (and therefore, the larger the number of assigned points P), the greater the number (n) of resin volume Vi is, and the more finely the filling state of the resin in the cavity can be expressed.

According to the cavity data of the table TB shown in FIG. 3, if the points P51 and P52 and the points P53 and P54 are connected for the cavity on the screen shown in FIG. 2 by means of straight lines (the number of the connecting lines is 2, that is, L2=2), for example, and if the closed region defined by these straight lines and the cavity contour is smeared all over for discrimination, then this region indicates that the cavity is filled with the resin for a volume V5.

Thereupon, after the common RAM 105 is stored with the cavity data (table TB and cavity profile), as mentioned before, molding conditions are set, injection is started, and monitoring is executed. Tentative values small enough not to destroy the mold are set for the injection speed, injection pressure, and dwell pressure, among other molding conditions. When the injection is started under the conditions set in this manner, the address generator 118 successively assigns the respective addresses of the RAMs 108 and 109 from the address 0 with every predetermined cycle after the start of the injection. Based on this address generation, the assigned addresses of the RAMs 108 and 109 are stored individually with the screw position and pressure for each cycle. FIG. 4 illustrates a table which shows the contents stored in the RAMs 108 and 109. As shown in FIG. 4, an i'th address is stored with screw position data SCi and pressure data PRi at the time of address generation (t=iτ). In the table of this drawing, τ is a cycle for the address generation by the address generator 118.

Figure 5:
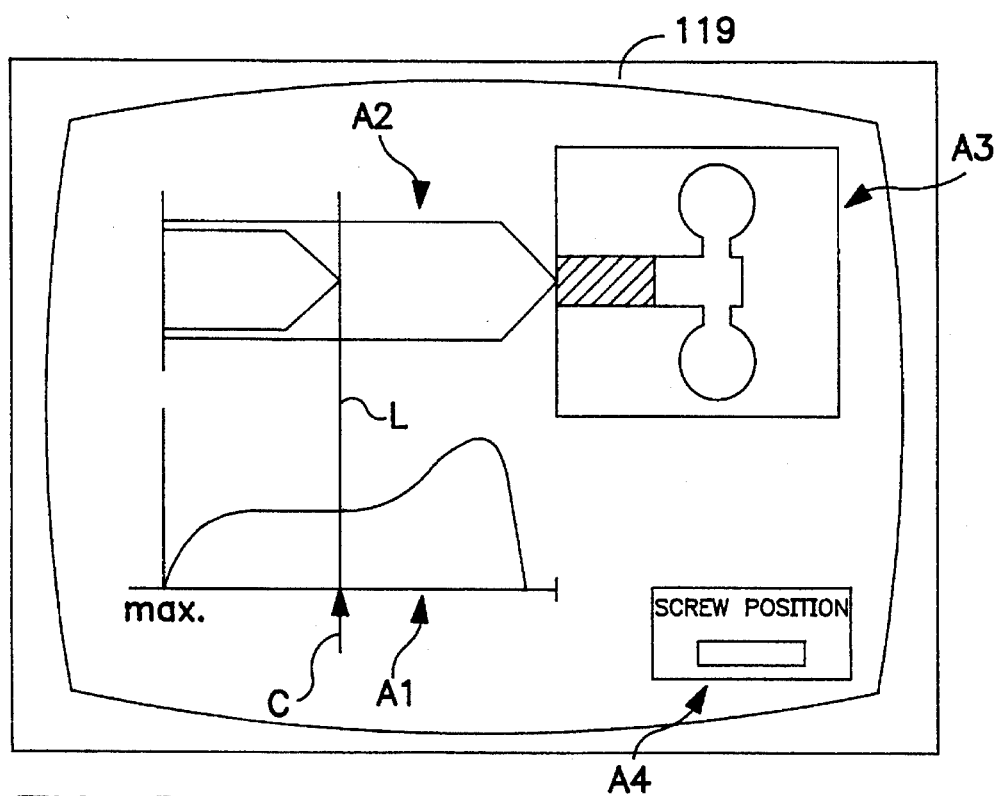
FIG. 5 is a diagram for illustrating a display picture displayed according to the method of the present invention.

FIG. 5 shows an example of the contents of the screen of the CRT/MDI 119 which displays the results of the monitoring. Referring to FIG. 5, coordinates A1 (hereinafter referred to as pressure display coordinates) for a pressure waveform graph whose axes of abscissa and ordinate represent the screw position and pressure respectively, and a field A4 for numerically displaying the screw position are arranged at the lower portion of the display screen. Also, a display region A2 for the cylinder and screw configurations and a display region A3 for drawing the mold cavity configuration (profile), as shown in FIG. 2, are arranged at the upper portion of the screen.

Further, the cursor C is displayed corresponding to the screw position displayed in the field A4, on the abscissa axis of the pressure waveform coordinates A1 which represents the screw position (position of the screw tip). As a mark for indicating the screw position, the vertical line L, which crosses the abscissa axis and passes through the picture of the screw above, is displayed corresponding to the display position for the cursor C. In the screen of FIG. 5, the screw position represented by the abscissa axis of the pressure waveform coordinates and the distal end position of the drawn cylinder are displayed corresponding to each other. As the cursor C is moved, as mentioned later, the vertical line L moves, and the value for the screw position of the display field A4 is changed correspondingly. When the screw position is entered in the display field A4, on the other hand, the cursor C and the vertical line L move to their respective positions corresponding to the abscissa axis and the picture of the cylinder configuration, in accordance with the enteredd screw position.

The following is a description of a first embodiment according to an injection pressure monitoring method of the present invention. According to this embodiment, the contents shown in FIG. 5 are displayed on the screen of the CRT/MDI 119, and the cursor C is moved to shift the vertical line L by key operation. Thereupon, the screw position corresponding to the coordinate position of the cursor C is displayed in the display field A4, and at the same time, the screw on the screen moves in the cylinder as the vertical line L moves. As the screw moves in this manner, moreover, the resin is filled into the cavity. These processes are displayed in the display region A3 for the cavity.

Figure 6:
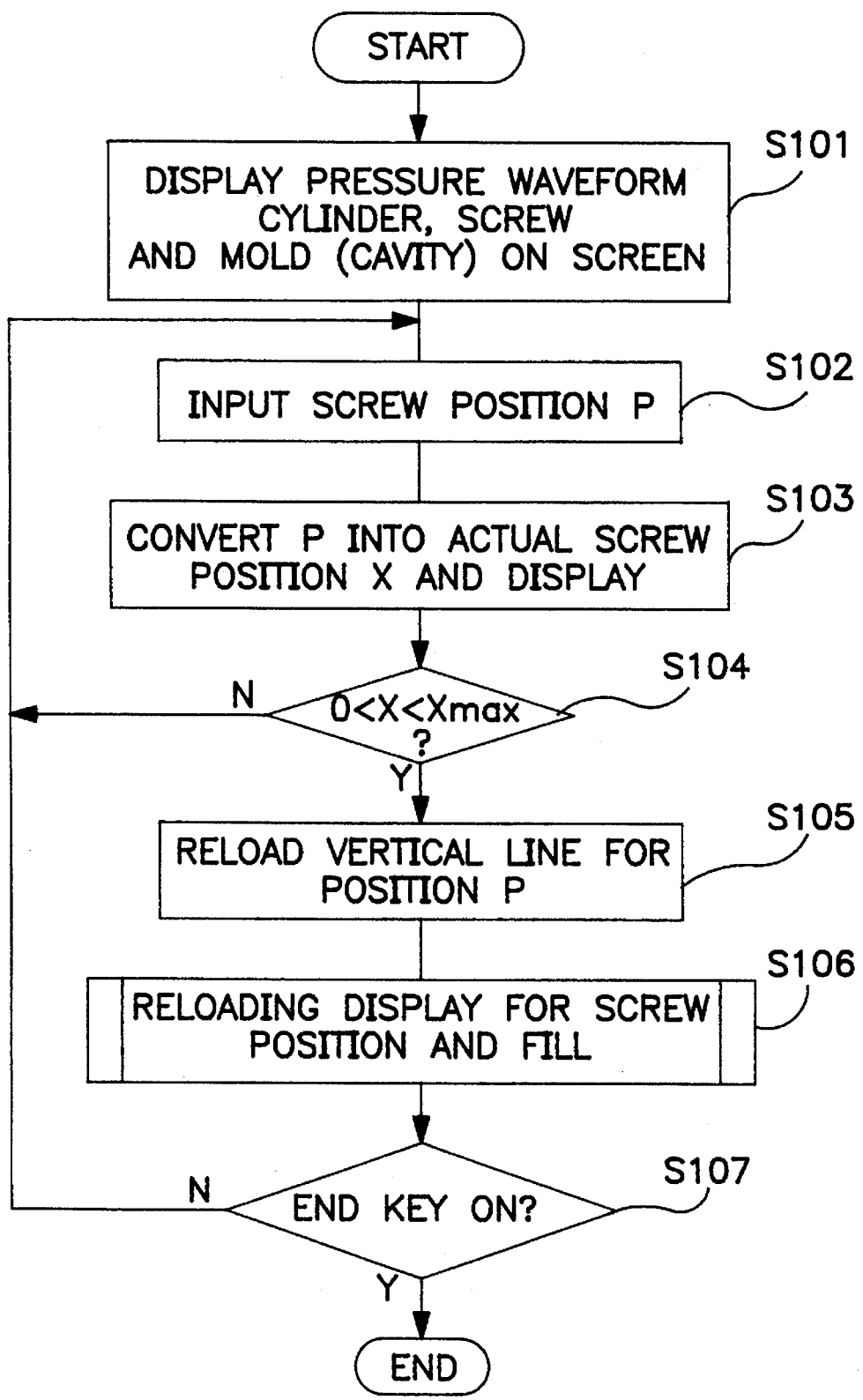
FIG. 6 is a flow chart showing a process according to a first embodiment of the present invention.

A process for executing this first embodiment will be described with reference to the flow chart of FIG. 6. After one cycle of injection is performed under the molding conditions, including the injection speed, dwell pressure, etc., tentatively set in the aforesaid manner, the PMCCPU 114 first draws the cylinder configuration, the configuration of the screw in a screw back position ($x_{max}$) in the cylinder configuration, and the mold cavity configuration (profile) on the CRT screen in accordance with the data stored in the common RAM 105, and displays the pressure waveform graph by plotting pressure values corresponding to the screw position, synchronously stored in th RAMs 108 and 109, on the pressure display coordinates (Step S101).

Then, the cursor C is moved along the abscissa axis of the pressure coordinates A1 of the screen to be brought to the screw position to be examined, using operating cursor keys with reference to the pressure waveform on the coordinates A1 (Step S102). The cursor C moves depending on the frequency of the operation of the cursor keys or the duration of their depression. If the depression of the cursor keys is stopped, then it is concluded that the screw position (cursor position P) is inputted. The position P of the cursor C, moved in this manner, on the abscissa axis is converted into a screw position (x) on the injection molding machine, and this value (x) is displayed in the display field A4 for the screw position (Step S103). This screw position (x) on the injection molding machine is given as a value obtained when the direction from the cylinder end position, as the origin (0), to the screw back position ($x_{max}$) is regarded as a positive direction. If the cursor position P moved by the key entry indicates that the screw is situated in a position beyond the cylinder end (0) or a position behind the screw back position ($x_{max}$) (Step S104), it is concluded that the entry is not a correct one, and the program returns to Step S102, whereupon re-entry of a correct value is awaited.

Figure 7:
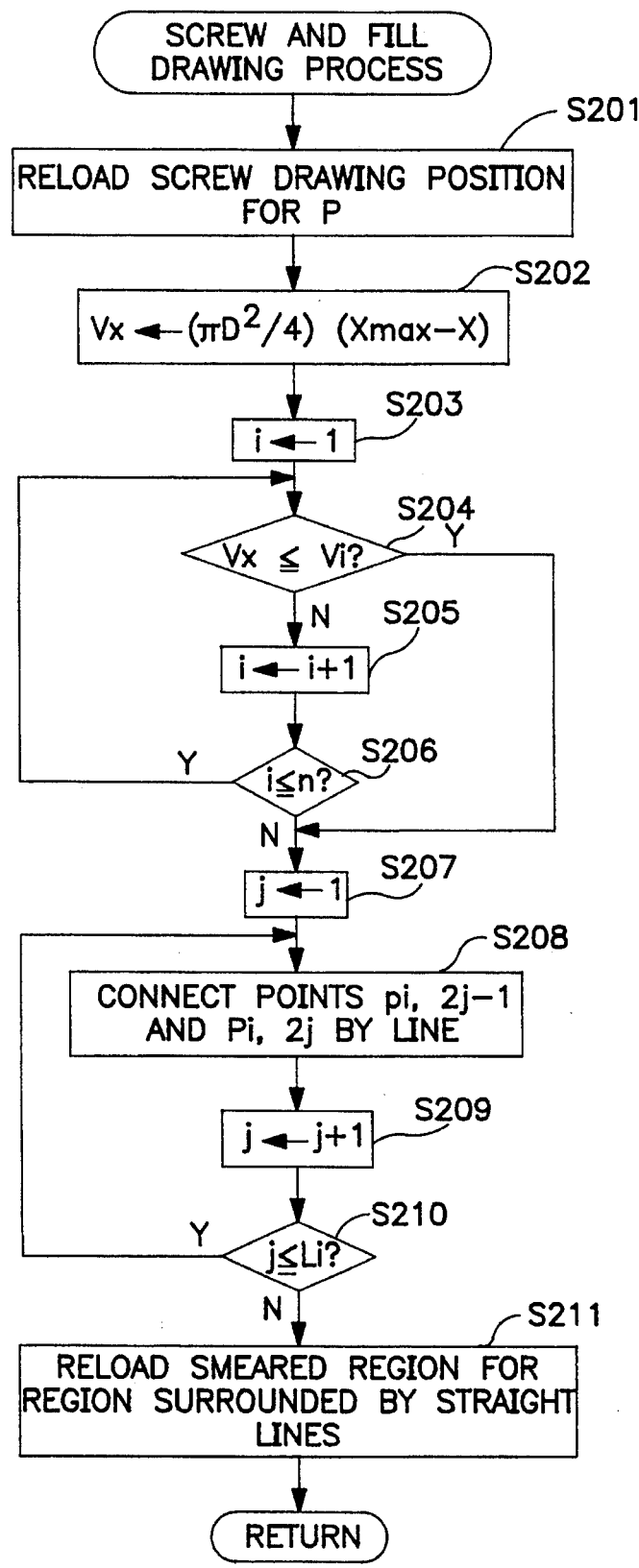
FIG. 7 is a flow chart showing a process for drawing a screw drawing position and a resin fill in the cavity.

If the cursor position P moved by the key entry indicates that the screw is situated between the cylinder end (0) and the screw back position ($x_{max}$), on the other hand, the previously displayed vertical line L is erased, and a new vertical line L is drawn in the cursor position P (Step S105). Subseqeuntly, the process of the subroutine shown in FIG. 7 is executed (Step S106).

In this subroutine process, the screw configuration previously drawn on the screen is erased, and a new screw configuration such that its tip end is situated in the position P is displayed. Initially, the tip end of the screw configuration on the screen, along with the cursor C and the vertical line L, is displayed in the screw back position ($x_{max}$). At the same time, the discriminative display of the filling state, having so far been displayed for the mold cavity on the screen, is erased, and a resin filling state based on the new screw position (x) is displayed for the aforesaid mold cavity configuration. A definite process for this display of the cavity filling state will be described later.

This process ends when an end key is depressed (Step S107). If another screw position is inputted without depressing this key, the process of Step S102 and its subsequent processes are repeated again.

Referring now to the flow chart of FIG. 7, an example of a subroutine process associated with Step S106 for reloading the screw position and the cavity filling state based on this screw position will be described.

First, the screw on the screen is displayed in the inputted cursor position P (Step S201). More specifically, the screw configuration is displayed so that the tip end of the screw is situated right over the cursor C on the abscissa axis. As the screw advances from the screw back position ($x_{max}$) to the screw position (x) corresponding to the position P of the cursor C, the volume of the resin filled in the cavity is calculated (Step S202). In this calculation, the volume or fill Vx is obtained according to the following equation based on the cylinder inside diameter (D) and screw stroke ($x_{max}-x$):

$$Vx=(\pi D^2/4)\times(x_{max}-x).$$

Then, an index i corresponding to the address of the table TB of the common RAM 105 is set at 1 (Step S203), and it is determined whether or not the calculated fill Vx is not greater than the volume Vi (V1 at the beginning) corresponding to the index i stored in the table TB. If the fill Vx is greater than the volume Vi, the value of the index i is incremented by 1 (Step S205). If this updated value of the index i is not greater than the number n of the divisions of the cavity capacity (Step S206), the program returns to Step S204, whereupon it is determined whether or not the calculated fill Vx is not greater than the volume Vi corresponding to the updated index i. If Vi equal to or greater than the fill Vx is found in the process of repeating this operation, the program proceeds to Step S207.

In the processes of Steps S204 to S206, the inputted fill Vx is compared in succession with the values V1, V2, V3, . . . stored in the table TB to find the value Vi (see FIG. 6) nearest to (but not less than) the fill Vx. If the fill Vx corresponding to the inputted screw position x is a value intermediate between volumes V6 and V7 stored in the table TB of the common RAM 105, the program proceeds to Step S207 in the next stage with the index i being 7.

When another index j is then initially set at 1 in Step S207, points Pi.2j-1 and Pi.2j stored in the table TB of the RAM 105 are connected by means of a straight line (Step S208). Initially, j is 1, so that Pi1 and Pi2 are connected. If the program proceeds to Step S207 when the index i is i=7, as in the above example, the points P7.1 and P7.2 are connected first. Then, the value of the index j is incremented by 1 (Step S209), and it is determined whether the incremented value is not greater than the number Li (see FIG. 7) of straight lines stored in the table TB, which corrsponds to the volume Vi (Step S210). In other words, it is determined whether or not there remain any other lines to connect other points than the line connecting the points Pi1 and Pi2. If there remain any points, that is, if the value of the index j is not greater than the number Li of straight lines, the program returns from Step S210 to Step S208, whereupon the points Pi.2j-1 and Pi.2j are connected in like manner by means of the straight line. If the number (L5, L6) of straight lines to be connected is "2", as in the cases of the volumes V5 and V6 in the table TB of FIG. 3, the program returns only once from Step S210 to Step S208, whereupon the process for connecting the points Pi.2j-1 and Pi.2j, that is, Pi3 and Pi4, by means of the straight line is executed.

If the value of the index j exceeds the number Li of straight lines to be connected after it is incremented one by one (Step S210), a discrimination process is executed such that the region inside the lines connected in Steps S208 to S210 is smeared all over (Step S211), and a process for displaying the extent to which the cavity is loaded with the resin as an image on the screen is executed. After this process is completed, the program returns to Step S107 of the flow chart of FIG. 6.

In this first embodiment, as shown in FIG. 5, the cursor C is situated, by key entry, on the abscissa axis of the pressure display coordinates A1 whose axes of abscissa and ordinate represent the screw position and pressure value, respectively, and the resin filling state obtained when the screw advances to the screw position (x) corresponding to the cursor position P is displayed as an image on the display region A3 of the screen, so that the relationships between the screw position, pressure, and filling state in the cavity can be understood at a glance. More specifically, the value of the pressure corresponding to the screw position on the injection molding machine can be immediately recognized by means of the vertical line L which is continuous with the cursor C, and at the same time, the region of the cavity to which the resin is filled and whether or not the leading end of the resin is moving to the region where the flow resistance greatly changes can be readily understood from the screen.

Figure 8:
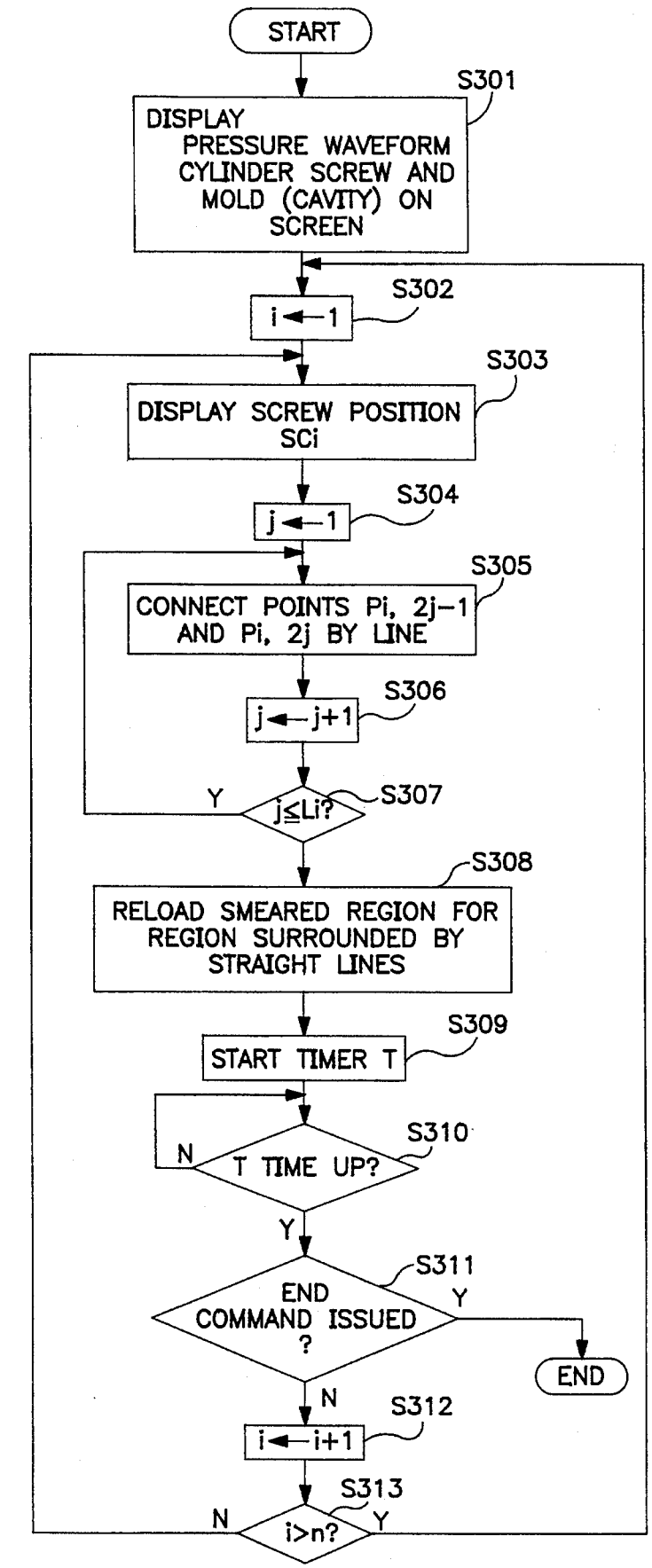
FIG. 8 is a flow chart showing a process according to a second embodiment of the present invention.

Referring now to the flow chart of FIG. 8, a second embodiment will be described in which the filling state of the resin in the cavity is displayed in slow motion on the screen, and the injection pressure at that time is also displayed on the screen.

Pressure value data for the screw position for each predetermined cycle is previously obtained, as shown in FIG. 4, by executing one cycle of injection in the aforesaid manner. When a monitor command is inputted, thereafter, the PMC-CPU 114 draws the pressure waveform, the cylinder configuration, the configuration of the screw in the screw back position ($x_{max}$) in the cylinder configuration, and the mold cavity configuration on the screen in the same manner as aforesaid (Step S301). This process is identical with the process of Step S101 shown in the flow chart of FIG. 6.

Then, the PMCCPU 114 sets the index i corresponding to the address of the table TB (FIG. 3) at "1" (Step S302) to obtain a screw position SCi (SC1 at the beginning) for filling the volume Vi corresponding to the index i, in accordance with the aforementioned relational expression for the screw position (x) and the fill (Vx). The screw configuration is drawn in the obtained screw position in the screw configuration display region A2, and this position is numerically displayed in the screw position display field A4 (Step S303).

Subsequently, the other index j is set at 1 (Step S304), and the points Pi.2j-1 and Pi.2j are connected by means of the straight line (Step S305). Then, the value of the index j is incremented by 1 (Step S306). If the incremented value of the index j is not greater than the number Li (see FIG. 3) of straight lines corresponding to the volume Vi (Step S307), the program returns to Step S305, whereupon the points Pi.2j-1 and Pi.2j are connected in like manner by means of the line.

If the value of the index j exceeds the number Li of straight lines to be connected for the discrimination of the volume Vi after it is incremented in this manner, the program proceeds to Step S308. Thereupon, a discrimination process is executed such that the resin inlet side of a closed region in the cavity defined by the straight lines connected in Steps S305 to S307 is smeared all over, and the region of the cavity to which the resin is filled is displayed as an image on the screen. The processes of Steps S304 to S308, among other processes, are identical with the processes of Steps S203 to S211 shown in FIG. 7.

When the above-described display process is finished, a timer T is started (Step S309). In a predetermined time after the start of this timer T (Step S310), it is determined whether an end command is issued or not (Step S311). If it is issued, this process is finished. If the end command is not issued, the value of the index i is incremented by 1 (Step S312). If the incremented value of the index j is not greater than the cavity division number n, the program returns to Step S308, whereupon the same processes as aforesaid are executed thereafter for the next address. If the value of the index i exceeds the division number n, the program returns to Step S302, wherupon the address is changed to i=1, and the aforesaid processes are repeatedly executed.

The aforesaid timer T is used to set the time for updating the address i for the screw by 1. By changing the set time of the timer T, therefore, the speed of displaying the variation of the cavity filling state on the screen can be increased or decreased, that is, adjusted as required.

In the example described above, the cavity filling state observed as the address for the screw is automatically increased by 1 with every predetermined time is displayed on the screen at a speed equal to a fraction of the actual speed (or in slow motion), and at the same time, the pressure value obtained at the screw position is displayed. Thus, the variation of the cavity filling state can be checked at a desired speed while monitoring the variation of the pressure observed as the screw is gradually advanced, so that whether the injection speed is properly changed or not can be easily judged by the movement of the image on the screen.

Figure 9:
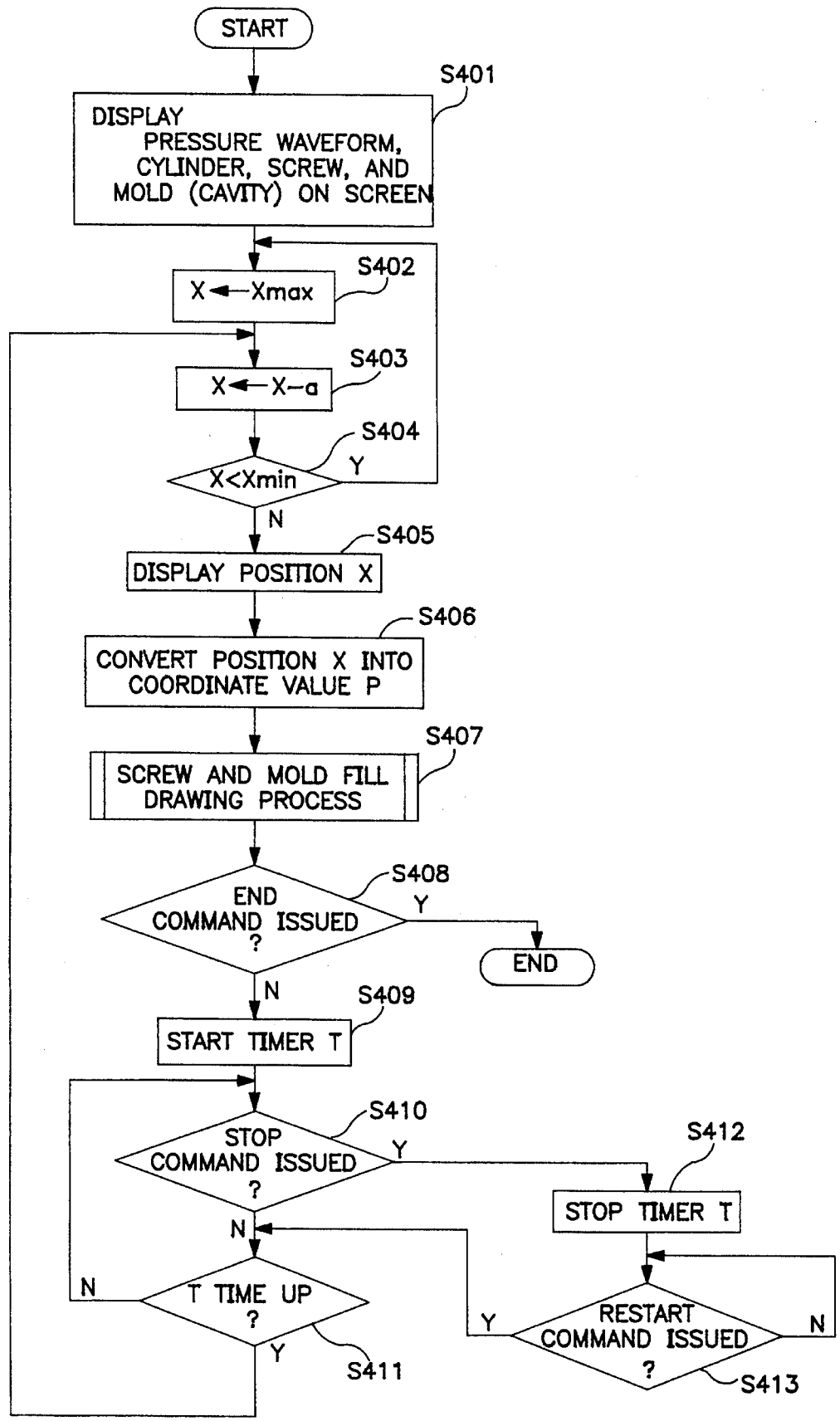
FIG. 9 is a flow chart showing a process according to a third embodiment of the present invention.

Referring now to the flow chart of FIG. 9, a third embodiment will be described in which the screw is moved at a fixed speed, and the injection pressure and the variation of the cavity filling state are displayed on the screen, corresponding to the screw position.

When the monitor command is inputted after executing one cycle of injection in the same manner as aforesaid, the PMCCPU 114 draws the pressure waveform, the cylinder configuration, the configuration of the screw in the screw back position ($x_{max}$) in the cylinder configuration, and the mold cavity configuration on the screen (Step S401). This process is identical with the process of Step S101 shown in the flow chart of FIG. 6.

Then, the screw position x is adjusted to the screw back position ($x_{max}$) (Step S402).

Thereafter, the screw position (x) is advanced a predetermined distance a from the current position x (Step S403). Since the screw position x is based on the distal end of the cylinder as the origin (0), it is in the negative direction with respect to the advancing direction of the screw. The predetermined distance a, that is, the distance covered at a stroke, is a preset value, which is stored in a register. If the screw gets beyond an injection end position ($x_{min}$) as it is advanced in this manner, the program returns to Step S402, whereupon the screw position x is adjusted again to the screw back position ($x_{max}$).

If the injection end position ($x_{min}$) is not reached by the advanced screw, on the other hand, the screw position x is displayed in the screw position display field A4 on the screen (Step S405), and is then converted into the coordinate value P (Step S406). Subseqeuntly, the screw configuration is drawn in the position corresponding to the converted coordinate value P in the display region A2, and the process for smearing the cavity on the screen all over, corresponding to this screw position x, that is, the subroutine process of FIG. 7 for drawing the screw and fill (Step S407).

If the end command is not issued after the subroutine process for drawing the screw and fill is executed (Step S408), the timer is then started (Step S409). If the set time of the timer T terminates (Step S411) without the depression of a stop button in the middle (Step S410), the programs proceeds again to Step S403, whereupon the screw further advances for the predetermined distance a. Thereafter, the same processes as aforesaid are executed. Thus, the screw automatically advances by the predetermined distance a with every set time of the timer T. This set time of the timer T can be changed as required.

In stopping the movement of the screw configuration on the screen while it is advancing by degrees, an operator depresses the stop key. When the stop key is depresed, this is sensed (Step S410), and the timer T is stopped (Step S412). In releasing the timer T from the stopped state, a restart command key is depressed. When a restart command is issued (Step S413), the program returns to Step S411, whereupon like processes are executed thereafter.

As described above, the variation of the cavity filling state can be recognized from the screen while monitoring the pressure when the screw is advanced at a uniform rate, so that fundamental materials for setting injection conditions, such as the screw speed changeover position, changeover amount, etc., can be obtained in the same manner as in the case of the second embodiment.

Figure 10:
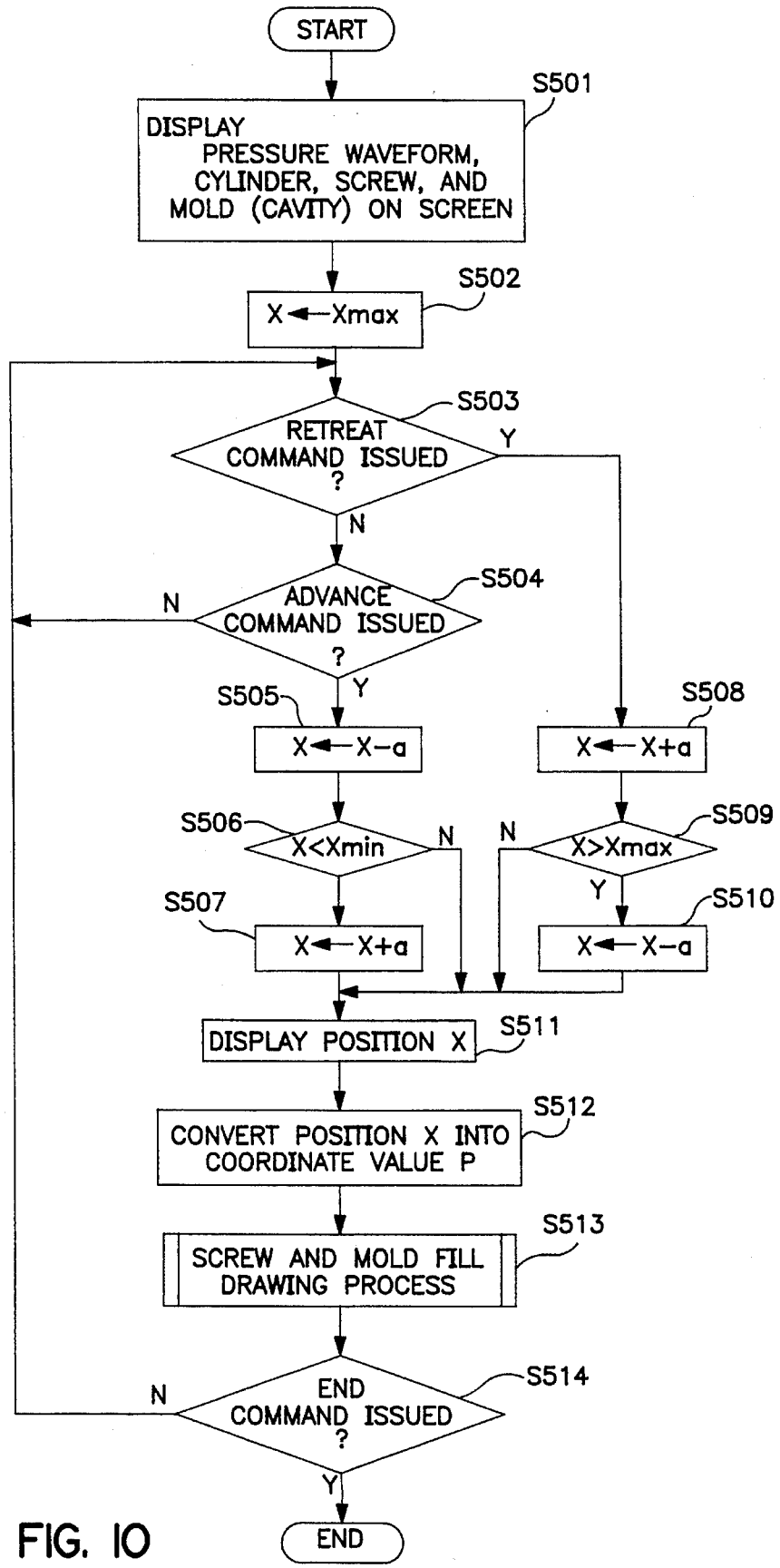
FIG. 10 is a flow chart showing a process according to a fourth embodiment of the present invention.

Referring now to the flow chart of FIG. 10, a fourth embodiment will be described in which the screw is advanced or retreated by the predetermined distance (a) at a time, and the injection pressure corresponding to the screw position and the variation of the cavity filling state are displayed on the screen.

When the monitor command is inputted after executing one cycle of injection in the same manner as aforesaid, the PMCCPU 114 draws the pressure waveform, the cylinder configuration, the configuration of the screw in the screw back position $(x_{max})$ in the cylinder configuration, and the mold cavity configuration on the screen (Step S501). This process is identical with the process of Step S101 shown in the flow chart of FIG. 6.

Then, the screw position x is adjusted to the screw back position $(x_{max})$ (Step S502). Thereafter, it is determined whether an advance command key ("→" key for the display screen of FIG. 5) or a retreat command key ("←" key), among other cursor keys, is depressed (Steps S503 and S504).

If the advance command key is depressed, the screw position x is reloaded for the position (x−a) (Step S505), that is, the screw is situated in the position advanced for the predetermined distance a. If this moved position (new x) is not beyond the tip end position $(x_{min})$ of the screw (Step S506), the program returns to Step S511, whereupon this screw position x is displayed in the screw position display field A4 on the screen.

This displayed screw position x is converted into the coordinate value P on the screen (Step S512 in the next stage). Then, the screw is displayed corresponding to the coordinate value P, and the subroutine process of FIG. 7 for drawing the screw and fill is executed corresponding to the screw position x (Step S513).

If the end command is issued after the aforesaid process is finished (Step S514), this process ends. If this command is not issued, the program returns to Step S503, whereupon the retreat command (Step S503) or the advance command (Step S504) is awaited.

If the screw position x gets beyond the screw tip end position $(x_{min})$ as the screw is advanced in this manner (Step S506), the screw is retreated for the predetermined distance a (Step S507), the resulting position is then displayed as the screw position x on the screen (Step S511), and the process of Step S512 and its subsequent processes are executed.

If the retreat command key is depressed (Step S503), on the other hand, the screw in the current position x is retreated for the predetermined distance a to be situated in the position (x+a) (Step S508). If this moved position (new screw position x) is not beyond the screw back position $(x_{max})$ (Step S509), this screw position is displayed on the screen (Step S511), and the process of Step S512 and its subsequent processes are executed.

If the screw reaches a position beyond the position $x_{max}$ as it is retreated in this manner (Step S509), the screw is advanced for the predetermined distance a (Step S510), the resulting position is then displayed as the screw position x on the screen (Step S511), and the process of Step S512 and its subsequent processes are executed thereafter.

According to this fourth embodiment, as described above, the screw position can be moved back or forth for the fixed distance by depressing the cursor key once, so that the cavity filling state can be easily recognized while monitoring the pressure in any desired position of the screw, and the variation of the pressure observed when the screw is moved from one position to another and the variation of the cavity filling state can be also recognized. By changing the value of this predetermined distance a, moreover, the movement of the screw caused by one stroke of key operation can be adjusted.

Figure 11:
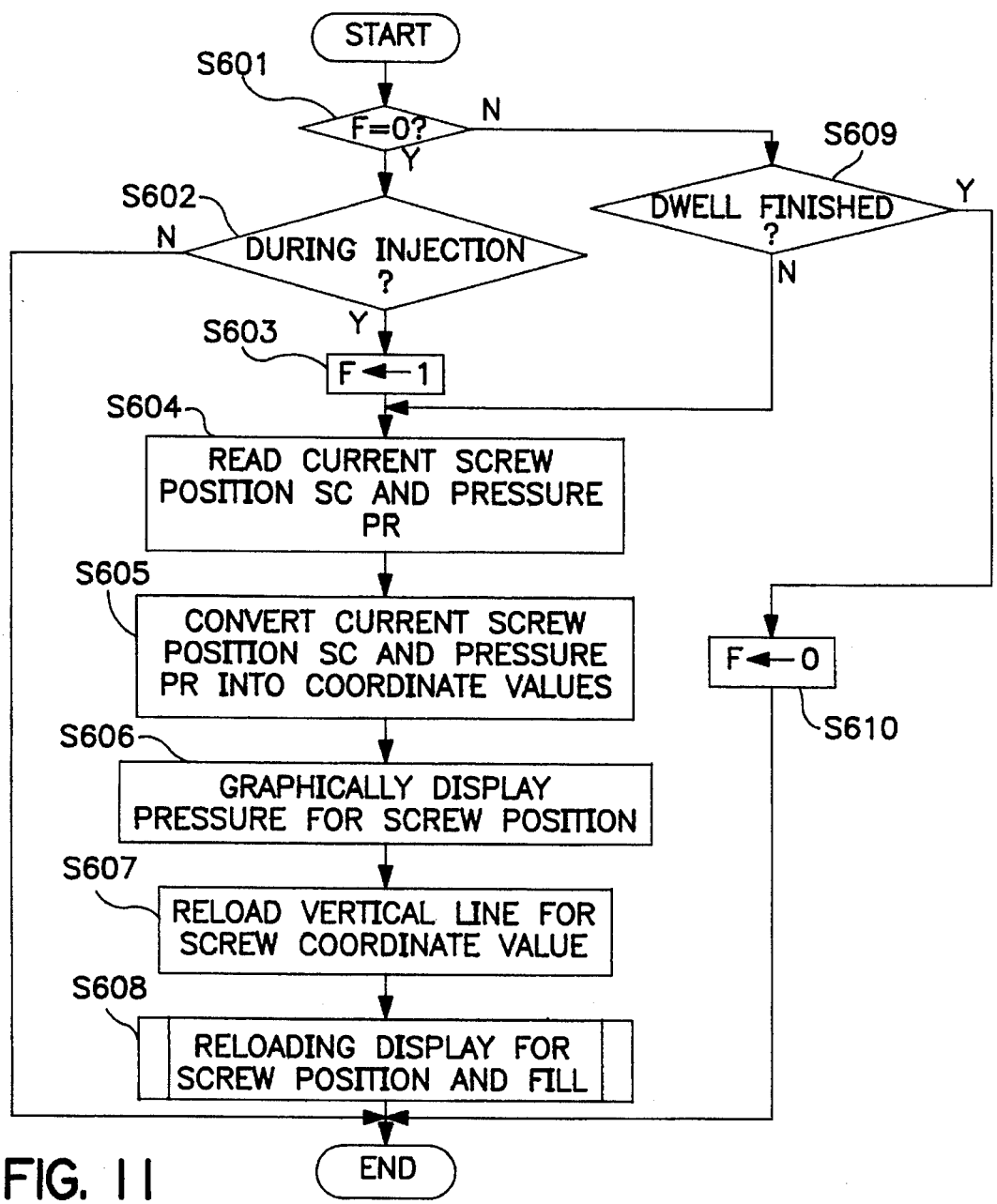
FIG. 11 is a flow chart showing a process according to a fifth embodiment of the present invention.

The following is a description of a fifth embodiment in which the cavity filling state is drawn at real time while monitoring the actual pressure during the continuous molding operation. When the monitor command is first inputted during the continous molding operation, the PMCCPU 114 draws the cavity configuration, cylinder configuration, and screw configuration on the display screen, and then executes the processes shown in FIG. 11 with every predetermined cycle.

First, it is determined whether a flag F is raised (F=1) or not (Step S601). If the flag F is not raised, it is then judged whether the injection is being executed or not (Step S602). If the injection is not being executed, the processes for the cycle concerned are finished. If it is concluded that the injection is started, on the other hand, the flag F is raised (Step S603). Since the PMCCPU 114 sets the flag indicative of the execution of the injection to "1" in the common RAM 104 when the injection stroke is entered, the execution of the injection is determined by detecting the state of this flag.

Then, the screw position SC currently delivered from the counter 102 and the pressure PR currently delivered from the A/D converter 101 are read (Step S604), the read current screw position Sc and pressure PR are converted into their respective values on the pressure display coordinates (Step S605), and the pressure corresponding to the screw position is displayed as the pressure waveform graph on the coordinates A1 (Step S606). Then, the vertical line is reloaded for the screw coordinate value (Step S607), and the screw drawing position and the fill position in the cavity are reloaded (Step S608), whereupon the processes for the cycle concerned are finished.

Since the flag F is raised (F=1) in the next cycle, the program proceeds from Step S601 to Step S609, whereupon it is determined whether dwell is finished or not. If the dwell is not finished, the program proceeds to Step S604, whereupon the aforesaid process is executed, the graph of the pressure corresponding to the screw position is displayed in succession, the screw drawing position is reloaded, and the fill position in the cavity is reloaded.

When the dwell stroke is finished in this manner, the program proceeds from Step S609 to Step S610, whereupon the flag F is reset to "0", and the cycle concerned is finished. In the next cycle and thereafter, only the processes of Steps S601 and S602 are executed until the injection is started.

According to the fifth embodiment, as described above, the injection (dwell) pressure, screw position, and resin fill position in the cavity, for the actual injection stroke during the continuous molding operation, is displayed, so that the actual speed, pressure, and cavity filling state can be grasped in association with one another, corresponding to the set injection speed and set pressure.

In any of the embodiments described herein, the position of the screw in the cylinder and the cavity filling state are simultaneously displayed corresponding to the pressure waveform. Alternatively, however, the position of the screw in the cylinder need not be drawn. In this case, only the the pressure waveform, cavity filling state, and screw position (numerical value) are displayed. Alternatively, moreover, only the pressure waveform and the position of the screw in the cylinder may be drawn.

In the embodiments described above, furthermore, the molding conditions are set, the injection speed, dwell pressure, etc. are set at the tentative values, and the pressure waveform is drawn on the basis of the pressure waveform data originated by executing one cycle of injection. Alternatively, however, only the screw position and the cavity filling state may be drawn without obtaining the pressure waveform data (e.g., the pressure waveform is not drawn in Steps S101, S301, S401 and S501). In this case, the drawn information can be utilized in determining the tentative injection speed and dwell pressure, determining the injection speed and dwell pressure from the beginning, or determining the screw back position and the like.

We claim:

1. An injection pressure monitoring method wherein a cylinder contains a resin and a screw which moves to inject said resin into a mold cavity, and the method uses a screw position detecting means for detecting a screw position in said cylinder, an injection pressure sensor means for detecting a pressure acting on said resin being injected into said mold cavity, and a display device, said method comprising the steps of:

storing data relating to said mold cavity;

executing at least one cycle of injection of said resin into said mold cavity;

displaying a configuration of said mold cavity based on said data, and a pressure waveform detected during said injection by said injection pressure sensor means and said screw position detecting means, said pressure waveform being a graph of said detected pressure versus said detected screw position, on said display device;

inputting a screw position;

displaying said input screw position on said display device;

obtaining a resin injection quantity based on said input screw position;

determining a position of a leading end of said resin being injected into said mold cavity based on said obtained resin injection quantity; and displaying a filling resin state of said resin into said displayed mold cavity based on said determined position of the leading end of said resin.

2. An injection pressure monitoring method according to claim 1, wherein the displaying a filling resin state step includes the steps of:

dividing the mold cavity into a plurality of regions;

obtaining the respective volumes of the individual divided regions;

storing said respective volumes;

comparing said resin injection quantity and said respective volumes; and discretely displaying in said displayed .mold cavity, beginning with the region including an inlet of said mold cavity and progressing with adjacent regions, those regions having volumes equal to said resin injection quantity.

3. An injection pressure monitoring method according to claim 1, further comprising the step of:

displaying a cylinder configuration of said cylinder and a screw configuration of said screw within said cylinder configuration in accordance with the input screw position.

4. An injection pressure monitoring method according to claim 1, further comprising the step of:

displaying a mark indicative of the input screw position in a position corresponding to the input screw position in the pressure waveform.

5. An injection pressure monitoring method according to claim 3, further comprising the step of:

displaying a mark indicative of the input screw position in a position corresponding to the input screw position in the pressure waveform.

6. An injection pressure monitoring method according to claim 1, wherein the entry of the input screw position is advanced in the injection direction for a distance automatically set with every predetermined time.

7. An injection pressure monitoring method according to claim 6, further comprising the step of:

displaying a cylinder configuration of said cylinder and a screw configuration of said screw within said cylinder in accordance with the input screw position.

8. An injection pressure monitoring method according to claim 6, further comprising the step of:

displaying a mark indicative of the input screw position in a position corresponding to the input screw position in the pressure waveform.

9. An injection pressure monitoring method according to claim 7, further comprising the step of:

displaying a mark indicative of the input screw position in a position corresponding to the input screw position in the pressure waveform.

10. An injection pressure monitoring method according to claim 1, wherein the entry of the input screw position is advanced or retreated for a set predetermined distance every time a movement command key is depressed.

11. An injection pressure monitoring method according to claim 10, further comprising the step of:

displaying a cylinder configuration of said cylinder and a screw configuration of said screw within said cylinder configuration in accordance with the input screw position.

12. An injection pressure monitoring method according to claim 10, further comprising the step of:

displaying a mark indicative of the input screw position in a position corresponding to the input screw position in the pressure waveform.

13. An injection pressure monitoring method according to claim 11, further comprising the step of:

displaying a mark indicative of the input screw position in a position corresponding to the input screw position in the pressure waveform.

14. An injection pressure monitoring method wherein a cylinder contains a resin and a screw which moves to inject said resin into a mold cavity, and the method uses a screw position detecting means for detecting a screw position in said cylinder, an injection pressure sensor means for detecting a pressure acting on said resin being injected into said mold cavity, and a display device, said method comprising the steps of:

executing at least one cycle of injection of said resin into said mold cavity;

displaying, on said display device, a pressure waveform detected during said injection by said injection pressure sensor means and said screw position detecting means, said pressure waveform being a graph of said detected pressure versus said detected screw position; and displaying a cylinder configuration of said cylinder and a screw configuration of said screw within said cylinder configuration as a screw position is inputted.

15. An injection pressure monitoring method according to claim 14, further comprising the step of:

displaying a mark indicative of the input screw position in a position corresponding to the input screw position in the pressure waveform.

16. An injection pressure monitoring method wherein a cylinder contains a resin and a screw which moves to inject said resin into a mold cavity, and the method uses a screw position detecting means for detecting a screw position in said cylinder, an injection pressure sensor means for detecting a pressure acting on said resin being injected into said mold cavity, and a display device, said method comprising the steps of:

dividing the mold cavity into a plurality of regions;

obtaining the respective volumes of the individual divided regions;

storing said respective volumes, and the configuration of the mold cavity;

executing at least one cycle of injection of said resin into said mold cavity;

displaying the cavity configuration and a pressure waveform detected during said injection by said injection pressure sensor means and said screw position detecting means, said pressure waveform being a graph of said detected pressure versus said detected screw position, on said display device;

successively reading said stored respective volumes with every set predetermined time;

obtaining a screw position of said screw corresponding to the injection of a resin quantity of said resin corresponding to said respective volumes read with every set predetermined time;

displaying said screw position on said display device; and discretely displaying on said display device, the region in the displayed cavity corresponding to the read volumes.

17. An injection pressure monitoring method according to claim 16, further comprising the step of:

displaying said cylinder on said display device, and a screw configuration of said screw within said cylinder in accordance with the input screw position.

18. An injection pressure monitoring method according to claim 16, further comprising the step of:

displaying a mark indicative of the input screw position in a position corresponding to the input screw position in the pressure waveform.

19. An injection pressure monitoring method wherein a cylinder contains a resin and a screw which moves to inject said resin into a mold cavity, and the method uses a screw position detecting means for detecting a screw position in said cylinder, an injection pressure sensor means for detecting a pressure acting on said resin being injected into said mold cavity, and a display device, said method comprising the steps of:

storing data relating to said mold cavity;

displaying said mold cavity on said display device in accordance with said data;

starting injection of said resin into said mold cavity;

detecting a screw position and a pressure using said screw position detecting means and said injection pressure sensor means, with every predetermined cycle;

graphically displaying the detected pressure versus the detected screw position on said display device;

obtaining a quantity of said resin to be filled into said mold cavity in accordance with the detected screw position; and displaying a resin filling state of said resin into said displayed mold cavity, corresponding to said obtained resin quantity.

20. An injection pressure monitoring method according to claim 19, further comprising the step of:

displaying a cylinder configuration of said cylinder on said display device, and a screw configuration of said screw within said displayed cylinder configuration in accordance with the input screw position.

21. An injection pressure monitoring method according to claim 20, further comprising the step of:

displaying a mark indicative of the input screw position in a position corresponding to the input screw position in the graphically displayed detected pressure versus screw position.

* * * * *

UNITED STATES PATENT AND TRADEMARK OFFICE
CERTIFICATE OF CORRECTION

PATENT NO. : 5,549,857
DATED : August 27, 1996
INVENTOR(S) : Masao KAMIGUCHI et al.

It is certified that error appears in the above-indentified patent and that said Letters Patent is hereby corrected as shown below:

Title Page, Item [75], "Oshino-mura" should be --Yamanashi--.

Column 1, line 5, "PCT/JP/92/00205" should be --PCT/JP92/00206--.

Signed and Sealed this

Twenty-fourth Day of December, 1996

Attest:

BRUCE LEHMAN

*Attesting Officer*     *Commissioner of Patents and Trademarks*